United States Patent
Lin et al.

(10) Patent No.: US 9,960,594 B1
(45) Date of Patent: May 1, 2018

(54) SYSTEM FOR DYNAMICALLY CONTROLLING AN OPERATION OF OVER VOLTAGE PROTECTION AND A VOLTAGE CONVERTER

(71) Applicant: WELTREND SEMICONDUCTOR INC., Hsinchu (TW)

(72) Inventors: Mu-Chih Lin, Hsinchu (TW); Ming-Ying Kuo, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days. days.

(21) Appl. No.: 15/401,090

(22) Filed: Jan. 8, 2017

(30) Foreign Application Priority Data

Oct. 28, 2016 (TW) .............................. 105134910 A

(51) Int. Cl.
*H02M 3/335* (2006.01)
*H02H 9/04* (2006.01)
*H02M 1/32* (2007.01)

(52) U.S. Cl.
CPC .............. *H02H 9/044* (2013.01); *H02M 1/32* (2013.01); *H02M 3/33523* (2013.01)

(58) Field of Classification Search
CPC .... H02H 9/044; H02M 1/32; H02M 3/33523; H03K 17/0822; H01L 27/0266; H01L 27/0251
USPC ...... 363/21.01–21.18, 56.01, 84; 361/18, 56, 361/59, 60, 90, 91.1–91.8, 92, 93.7
See application file for complete search history.

(56) References Cited

U.S. PATENT DOCUMENTS

| | | | | |
|---|---|---|---|---|
| 5,615,097 | A * | 3/1997 | Cross | H02H 7/1252 361/111 |
| 6,404,262 | B1 * | 6/2002 | Nagaraj | G06G 7/184 327/336 |
| 9,240,679 | B2 * | 1/2016 | Jung | H02H 1/06 |
| 2012/0170165 | A1 | 7/2012 | Jung | |
| 2013/0100719 | A1 * | 4/2013 | Tzeng | H02M 1/32 363/56.01 |
| 2016/0164273 | A1 * | 6/2016 | Tseng | H02H 3/20 361/18 |
| 2016/0190936 | A1 * | 6/2016 | Ke | H02M 3/33507 363/21.12 |

FOREIGN PATENT DOCUMENTS

| | | |
|---|---|---|
| TW | 201225463 A1 | 6/2012 |
| TW | 201539960 A | 10/2015 |
| TW | 1551021 B | 9/2016 |

* cited by examiner

*Primary Examiner* — Yemane Mehari
(74) *Attorney, Agent, or Firm* — Winston Hsu

(57) ABSTRACT

A system for dynamically controlling over voltage protection includes a voltage detection circuit, an over voltage protection reference signal output circuit, and an over voltage control signal output circuit. The voltage detection circuit is used for detecting a voltage and outputting a sampled voltage according to the voltage. The over voltage protection reference signal output circuit is coupled to the voltage protection circuit for generating an over voltage protection reference signal according to the sampled voltage and a voltage feedback signal. The over voltage control signal output circuit is coupled to the voltage detection circuit and the over voltage protection reference signal output circuit for generating an over voltage control signal according to the sampled voltage and the over voltage protection reference signal.

11 Claims, 10 Drawing Sheets

SYSTEM FOR DYNAMICALLY CONTROLLING AN OPERATION OF OVER VOLTAGE PROTECTION AND A VOLTAGE CONVERTER

BACKGROUND OF THE INVENTION

1. Field of the Invention

The present invention illustrates a system for dynamically controlling an operation of over voltage protection, and more particularly, a system capable of continuously detecting an output voltage and providing a dynamic voltage protection threshold of a voltage converter.

2. Description of the Prior Art

With advancement of techniques, various electronic devices are popularly adopted in our daily life. Specifically, each electronic device uses a standard or a specific driving voltage to enable various functions. In order to drive various electronic devices, a voltage converter or a power adapter is required for converting a voltage outputted from a power grid to a driving voltage receiver compatible with a designated electronic device. By doing so, the designated electronic device can be driven by an appropriate voltage.

In general, to improve an operational efficiency of the voltage converter, the voltage converter is designed to provide multiple voltages. For example, when the electronic device is a smartphone, the voltage converter can provide a voltage for charging a battery under a normal charging mode. The voltage converter can also provide another voltage for charging the battery under a quick charging mode. Further, to avoid irreversible circuit damage caused by an abnormal high voltage, an over voltage protection circuit (OVP circuit) is generally applied to the voltage converter for detecting an output voltage and providing a function of over voltage protection. A method for performing over voltage protection function of the OVP circuit is to predetermine an upper bound voltage (or say, a voltage protection level) according to a maximum output voltage supported by the voltage converter. When the output voltage is greater than the upper bound voltage, the OVP circuit is enabled for protecting circuit.

As aforementioned, the voltage converter can provide multiple voltages. As a result, when the OVP circuit is enabled according to a fixed upper bound voltage (i.e., corresponding to the maximum output voltage supported by the voltage converter), high withstand voltage components are required for a loading device, thereby leading to increase circuit size and manufacturing cost.

SUMMARY OF THE INVENTION

In an embodiment of the present invention, a system for dynamically controlling an operation of over voltage protection is disclosed. The system comprises a voltage detection circuit, an over voltage protection reference signal output circuit, and an over voltage control signal output circuit. The voltage detection circuit is configured to detect a voltage and output a sampled voltage according to the voltage. The over voltage protection reference signal output circuit is coupled to the voltage detection circuit and configured to generate an over voltage protection reference signal according to the sampled voltage and a voltage feedback signal. The over voltage control signal output circuit is coupled to the voltage detection circuit and the over voltage protection reference signal output circuit and is configured to generate an over voltage control signal according to the sampled voltage and the over voltage protection reference signal.

In another embodiment of the present invention, a voltage converter capable of performing an operation of over voltage protection dynamically is disclosed. The voltage converter comprises a voltage input circuit, a transformer module, a voltage feedback signal generation circuit, a voltage induction module, and a control unit. The voltage input circuit is configured to receive an input voltage. The transformer module is coupled to the voltage input circuit and configured to convert the input voltage to an output voltage. The voltage feedback signal generation circuit is coupled to the transformer module and configured to generate a voltage feedback signal. The voltage induction module is coupled to the voltage input circuit and configured to generate a voltage. The control unit is coupled to the transformer module, the voltage feedback signal generation circuit, and the voltage induction module and configured to control the transformer module. The control unit comprises a voltage detection circuit, an over voltage protection reference signal output circuit, and an over voltage control signal output circuit. The voltage detection circuit is configured to detect the voltage and output a sampled voltage according to the voltage. The over voltage protection reference signal output circuit is coupled to the voltage detection circuit and configured to generate an over voltage protection reference signal according to the sampled voltage and the voltage feedback signal. The over voltage control signal output circuit is coupled to the voltage detection circuit and the over voltage protection reference signal output circuit and configured to generate an over voltage control signal according to the sampled voltage and the over voltage protection reference signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
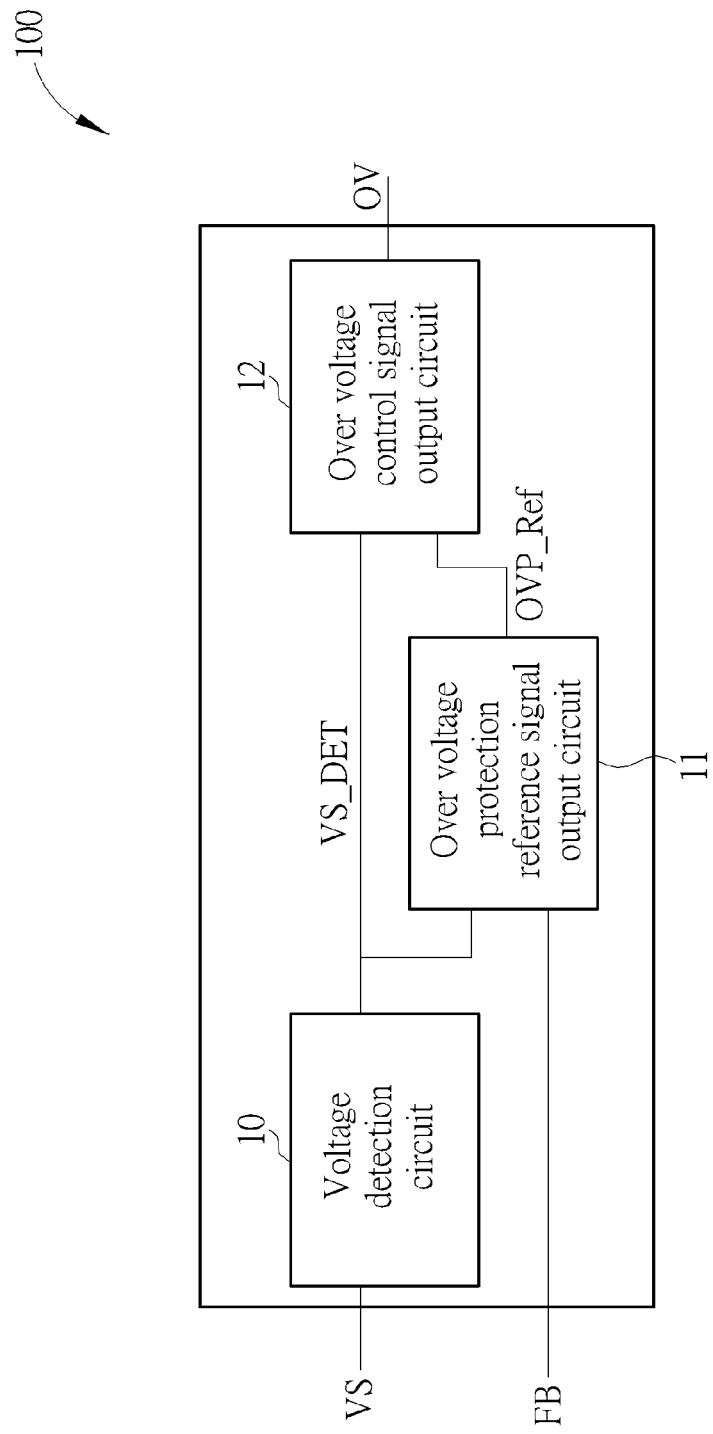
FIG. 1 is a block diagram of a system for dynamically controlling an operation of over voltage protection according to an embodiment of the present invention.

FIG. 1 is a block diagram of a system 100 for dynamically controlling an operation of over voltage protection. In the present invention, the system 100 can be applied to any voltage converter. The system 100 has a capability of detecting an output voltage (or voltage fluctuation) from a voltage converter continuously. Specifically, the system 100 can output an over voltage control signal OV for dynamically triggering an over voltage protection circuit (OVP circuit) to perform circuit protection function in the voltage converter. In other words, the system 100 can be regarded as a control system applied to the voltage converter for controlling the OVP circuit. As shown in FIG. 1, the system 100 includes a voltage detection circuit 10, an over voltage protection reference signal output circuit 11, and an over voltage control signal output circuit 12. The voltage detection circuit 10 is used for detecting a voltage VS and outputting a sampled voltage VS_DET according to the voltage VS. Particularly, the voltage VS can be an output voltage of the voltage converter. The voltage VS can also be a divided voltage from the output voltage. The voltage VS can also be a coupled voltage from the output voltage. In other words, when the output voltage of the voltage converter is increased, the voltage VS is also increased. The over voltage protection reference signal output circuit 11 is coupled to the voltage detection circuit 10 for generating an over voltage protection reference signal OVP_Ref according to the sampled voltage VS_DET and a voltage feedback signal FB. Here, the voltage feedback signal FB can be generated by a voltage feedback signal generation circuit. A structure of the voltage feedback signal generation circuit is illustrated later. The voltage feedback signal FB is correlated with the output voltage of the voltage converter. When the output voltage is lower than a threshold, the voltage feedback signal FB is increased gradually. Then, the voltage converter is controlled for boosting the output voltage. When the output voltage is higher than the threshold, the voltage feedback signal FB is decreased gradually. Then, the voltage converter is controlled for decreasing the output voltage. In an abnormal condition, when the voltage feedback signal FB is irrelevant to the output voltage and uncontrollably increased over time, the output voltage is uncontrollably increased over time accordingly. Thus, the conventional voltage converter or a loading device coupled to the conventional voltage converter may be damaged or burned out since the conventional voltage converter lacks the system 100 for dynamically triggering the OVP circuit to enable circuit protection. In the system 100, the over voltage control signal output circuit 12 is coupled to the voltage detection circuit 10 and the over voltage protection reference signal output circuit 11 for generating an over voltage control signal OV according to the sampled voltage VS_DET and the over voltage protection reference signal OVP_Ref. Specifically, the over voltage control signal OV carries control information of the OVP circuit. In other words, when the system 100 is applied to the voltage converter, the OVP circuit of the voltage converter is operated (i.e., ON or OFF state) according to the over voltage control signal OV. Thus, the system 100 is suitable for continuously and dynamically controlling the enabling moment of the OVP circuit in the voltage converter, thereby achieving to perform an adaptive over voltage protection function. For presentation completeness, circuit structure and functionality of each module in the system 100 is illustrated below. All signal waveforms of the system 100 and a method of controlling the OVP circuit are also illustrated.

Figure 2A:
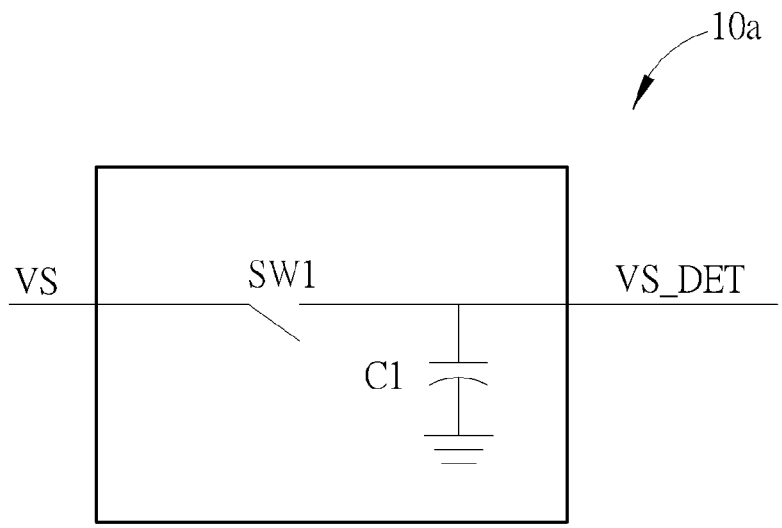
FIG. 2A is a first circuit structure of a voltage detection circuit of the system in FIG. 1.
Figure 2B:
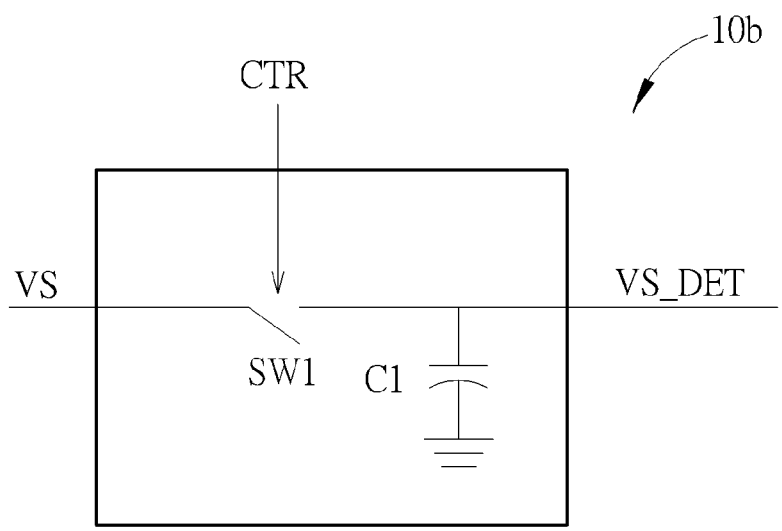
FIG. 2B is a second circuit structure of the voltage detection circuit of the system in FIG. 1.

FIG. 2A is a first circuit structure of a voltage detection circuit 10 of the system 100. FIG. 2B is a second circuit structure of the voltage detection circuit 10 of the system 100. To avoid ambiguity, a denotation of the voltage detection circuit in FIG. 2A is denoted as "10a" hereafter. A denotation of the voltage detection circuit in FIG. 2B is denoted as "10b" hereafter. The voltage detection circuit 10a includes a first switch SW1 and a first capacitor C1. The first switch SW1 includes a first terminal and a second terminal. The first terminal is used for receiving the voltage VS. The second terminal is used for outputting the voltage VS when the first switch SW1 is operated under a short state. The first capacitor C1 includes a first terminal and a second terminal. The first terminal is coupled to the second terminal of the first switch SW1 for outputting a sampled voltage VS_DET. The second terminal is coupled to a ground terminal. As shown in FIG. 2A, since the voltage detection circuit 10a includes the first switch SW1 and the first capacitor C1, the voltage detection circuit 10a can be regarded as a sample-and-hold circuit. For example, when the first switch SW1 is under the short state, the sampled voltage VS_DET is equal to the voltage VS. At the moment, the sampled voltage VS_DET can be regarded as a result of the voltage VS being sampled. When the first switch SW1 is under an open state, the first capacitor C1 releases energy previously charged by sampling the voltage VS. At the moment, the sampled voltage VS_DET can be regarded as a result of the voltage VS being hold at a previous sample period. As a result, a waveform of the sampled voltage VS_DET can be expected as a stepped waveform. The variation of the sampled voltage VS_DET is illustrated later. In the voltage detection circuit 10a, the first switch SW1 can be an automatic switch capable of detecting and sampling the voltage VS automatically. As shown in FIG. 2B, the first switch SW1 can be a control switch in the voltage detection circuit 10b. The voltage detection circuit 10b is similar to the voltage detection circuit 10a. However, the voltage detection circuit 10b includes the first switch SW1 having a control terminal for receiving a control signal CTR. Specifically, the control signal CTR can be a system default clock signal or an external user-controlled clock signal. However, the voltage detection circuit 10 of the present invention is not limited to the voltage detection circuit 10a and the voltage detection circuit 10b. Any reasonable hardware modification falls into the scope of the present invention.

Figure 3:
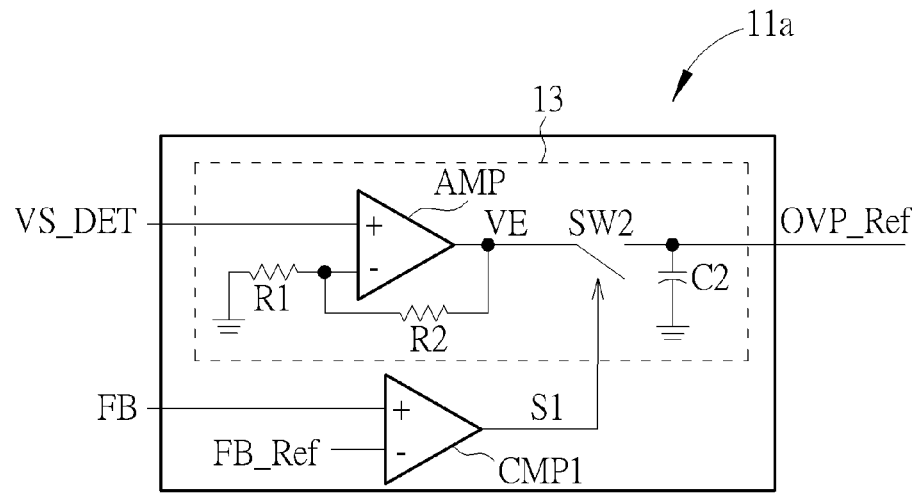
FIG. 3 is a first circuit structure of an over voltage protection reference signal output circuit of the system in FIG. 1.
Figure 4:
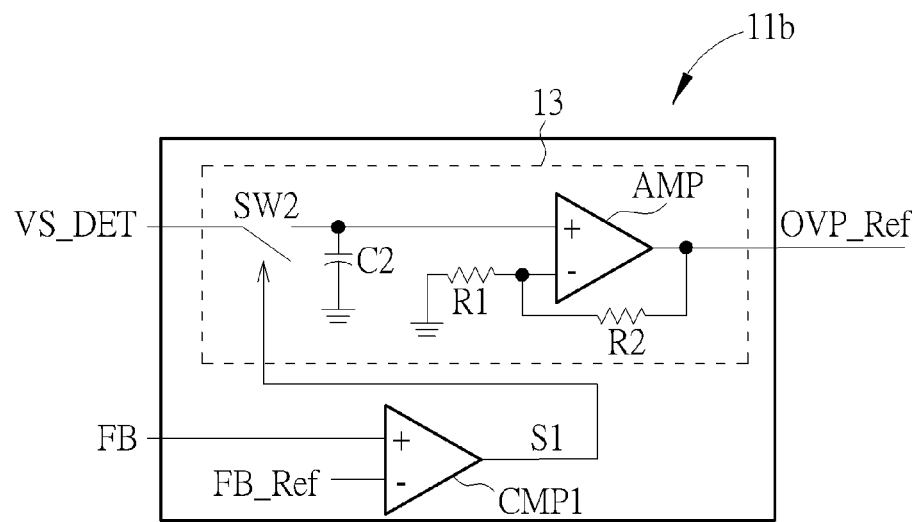
FIG. 4 is a second circuit structure of the over voltage protection reference signal output circuit of the system in FIG. 1.
Figure 5:
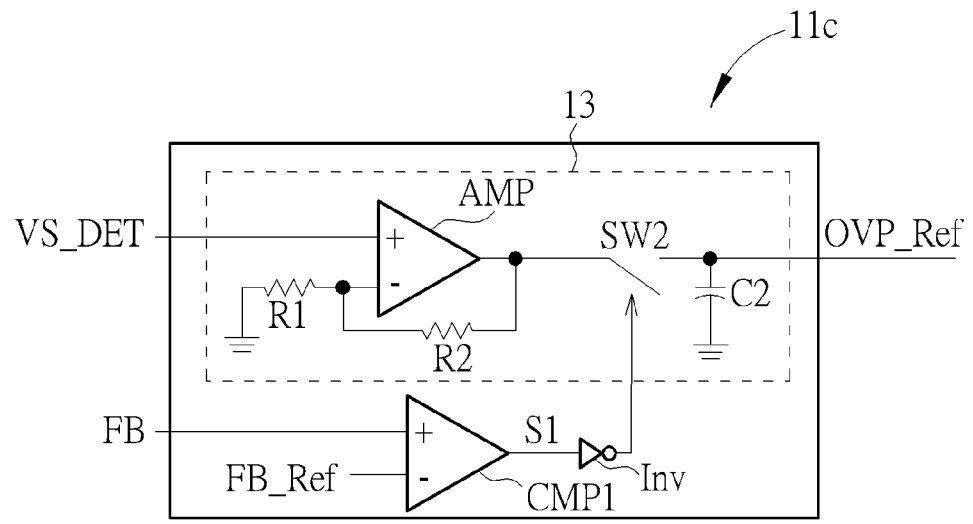
FIG. 5 is a third circuit structure of the over voltage protection reference signal output circuit of the system in FIG. 1.
Figure 6:
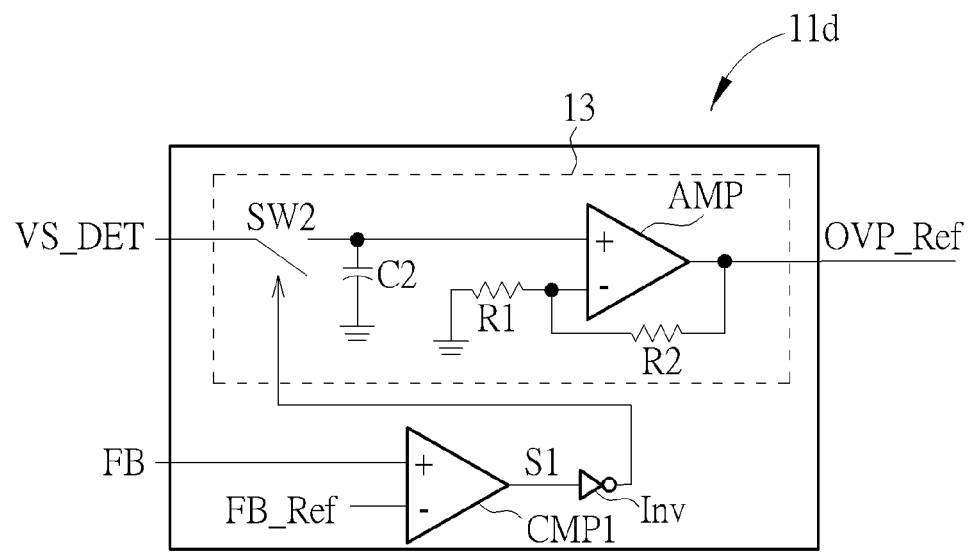
FIG. 6 is a fourth circuit structure of the over voltage protection reference signal output circuit of the system in FIG. 1.

FIG. 3 to FIG. 6 illustrates various circuit structures of an over voltage protection reference signal output circuit 11. To avoid ambiguity, a denotation of the over voltage protection reference signal output circuit in FIG. 3 is denoted as "11a" hereafter. A denotation of the over voltage protection reference signal output circuit in FIG. 4 is denoted as "11b" hereafter. A denotation of the over voltage protection reference signal output circuit in FIG. 5 is denoted as "11c" hereafter. A denotation of the over voltage protection reference signal output circuit in FIG. 6 is denoted as "11d" hereafter. The over voltage protection reference signal output circuit 11a includes an amplification storage circuit 13 and a first comparator CMP1. The first comparator CMP1 includes a first input terminal, a second input terminal, and an output terminal. The first input terminal is used for receiving the voltage feedback signal FB. The second input terminal is used for receiving a reference voltage FB_Ref. The output terminal is coupled to the amplification storage circuit 13 for outputting a first comparison signal S1 to the amplification storage circuit 13. Here, the reference voltage FB_Ref is a constant voltage. The reference voltage FB_Ref can be a system default value of a user-defined value. The amplification storage circuit 13 is used for outputting the over voltage protection reference signal OVP_Ref according to the sampled voltage VS_DET and the first comparison signal S1.

In the over voltage protection reference signal output circuit 11a, the amplification storage circuit 13 includes an amplifier AMP, a first resistor R1, a second resistor R2, a second switch SW2, and a second capacitor C2. The amplifier AMP includes a first input terminal, a second input terminal, and an output terminal. The first input terminal is coupled to the voltage detection circuit 10 for receiving the sampled voltage VS_DET. The output terminal is used for outputting an amplified voltage VE. The first resistor R1 includes a first terminal and a second terminal. The first terminal is coupled to a ground terminal. The second terminal is coupled to the second input terminal of the amplifier AMP. The second resistor R2 includes the first terminal and the second terminal. The first terminal is coupled to the second terminal of the first resistor R1. The second terminal is coupled to the output terminal of the amplifier AMP. Particularly, the amplifier AMP can be any device for boosting voltage. In the embodiment, a gain factor of the amplifier AMP depends on a ratio resistance of the resistor R1 to resistance of the resistor R2. Further, any reasonable hardware modification of the resistor R1 and the resistor R2 falls into the scope of the present invention. For example, the first resistor R1 can be replaced with two resistors coupled in series. The equivalent impedance of the two coupled resistors is equal to the impedance of the first resistor R1. The second switch SW2 includes a first terminal, a second terminal, and a control terminal. The first terminal is coupled to the second terminal of the second resistor R2 for receiving the amplified voltage VE. The second terminal is used for outputting the amplified voltage VE when the second switch SW2 is operated under a short state. The control terminal is coupled to the output terminal of the first comparator CMP1 for receiving a first comparison signal S1. The second capacitor C2 includes a first terminal and a second terminal. The first terminal is coupled to the second terminal of the second switch SW2 for outputting the over voltage protection reference signal OVP_Ref. The second terminal is coupled to the ground terminal. Specifically, operations of the first switch SW1 and the first capacitor C1 in the voltage detection circuit 10a are similar to the second switch SW2 and the second capacitor C2 in the over voltage protection reference signal output circuit 11a, while performing a function of sample-and-hold process. In other words, when the voltage feedback signal FB is greater than the reference voltage FB_Ref, the first comparison signal S1 outputted from the first comparator CMP1 is at a first voltage level so as to operate the second switch SW2 under an open state. When the voltage feedback signal FB is smaller than the reference voltage FB_Ref, the first comparison signal S1 outputted from the first comparator CMP1 is at a second voltage level so as to operate the second switch SW2 under a short state. Particularly, when the second switch SW2 is operated under the short state, a voltage level of the over voltage protection reference signal OVP_Ref is equal to the amplified voltage VE. Thus, the over voltage protection reference signal OVP_Ref can be regarded as a result of the amplified voltage VE being sampled. When the second switch SW2 is operated under the open state, the second capacitor C2 releases energy previously charged by the amplified voltage VE. At the moment, the over voltage protection reference signal OVP_Ref can be regarded as a result of the amplified voltage VE being held at a previous sample period. As a result, the over voltage protection reference signal OVP_Ref can be expected as a stepped waveform. The variation of the over voltage protection reference signal OVP_Ref is illustrated later. Obviously, in the over voltage protection reference signal output circuit 11a, the amplifier AMP, the second switch SW2, and the second capacitor C2 form a linear system. Thus, connection sequence of the amplifier AMP, the second switch SW2, and the second capacitor C2 can be modified. Briefly, the over voltage protection reference signal OVP_Ref generated by amplifying the sampled voltage VS_DET and then processing the sample-and-hold mechanism is equivalent to the over voltage protection reference signal OVP_Ref generated by processing the sample-and-hold mechanism and then amplifying the sampled voltage VS_DET. Some embodiments are illustrated below.

A circuit structure of an over voltage protection reference signal output circuit 11b in FIG. 4 is similar to the over voltage protection reference signal output circuit 11a. Similarly, the over voltage protection reference signal output circuit 11b includes all circuit components of the over voltage protection reference signal output circuit 11a, such as the amplifier AMP, the first resistor R1, the second resistor R2, the second switch SW2, the second capacitor C2, and the first comparator CMP1. Specifically, layout structures of amplification storage circuits of the over voltage protection reference signal output circuit 11a and the over voltage protection reference signal output circuit 11b are different. In the over voltage protection reference signal output circuit 11b, a first terminal of the second switch SW2 is coupled to the voltage detection circuit 10 for receiving the sampled voltage VS_DET. A second terminal of the second switch SW2 is used for outputting the sampled voltage VS_DET when the second switch SW2 is operated under a short state. A control terminal of the second switch SW2 is coupled to the output terminal of the first comparator CMP1 for receiving the first comparison signal S1. A first terminal of the second capacitor C2 is coupled to the second terminal of the second switch SW2. A second terminal of the second capacitor C2 is coupled to a ground terminal. A first input terminal of the amplifier AMP is coupled to the first terminal of the second capacitor C2. An output terminal of the amplifier AMP is used for outputting the over voltage protection reference signal OVP_Ref. A first terminal of the first resistor R1 is coupled to the ground terminal. A second terminal of the first resistor R1 is coupled to the second input terminal of the amplifier AMP. A first terminal of the second resistor R2 is coupled to the second terminal of the first resistor R1. A second terminal of the second resistor R2 is coupled to the output terminal of the amplifier AMP. Comparing the over voltage protection reference signal output circuit 11b with the over voltage protection reference signal output circuit 11a, it can be observed that connection sequences of the amplifier AMP, the second switch SW2, and the second capacitor C2 of the over voltage protection reference signal output circuit 11b and the over voltage protection reference signal output circuit 11a are different. In the over voltage protection reference signal output circuit 11a, the sampled voltage VS_DET is firstly amplified by using the amplifier AMP. Then, the output voltage of the amplifier AMP is sampled/hold by using the second switch SW2 and the second capacitor C2. In the over voltage protection reference signal output circuit 11b, the sampled voltage VS_DET is firstly sampled/hold by using the second switch SW2 and the second capacitor C2 and then amplified by using the amplifier AMP. Specifically, as aforementioned illustration, the amplifier AMP, the second switch SW2, and the second capacitor C2 form a linear system. Thus, the connection sequence of the amplifier AMP, the second switch SW2, and the second capacitor C2 can be modified. In other words, the over voltage protection reference signal OVP_Ref generated by amplifying the sampled voltage VS_DET and then processing the sample-and-hold mechanism (i.e., circuit 11a) is equivalent to the over voltage protection reference signal OVP_Ref generated by processing the sample-and-hold mechanism and then amplifying the sampled voltage VS_DET (i.e., circuit 11b).

In the over voltage protection reference signal output circuit 11a, the second switch SW2 is operated according to a voltage level of the first comparison signal S1. When the voltage feedback signal FB is greater than the reference voltage FB_Ref, the first comparison signal S1 outputted from the first comparator CMP1 is at a first voltage level. Then, the second switch SW2 is operated under an open state. When the voltage feedback signal FB is smaller than the reference voltage FB_Ref, the first comparison signal S1 outputted from the first comparator CMP1 is at a second voltage level. Then, the second switch SW2 is operated under a short state. However, any hardware modification falls into the scope of the present invention. For example, FIG. 5 is a third circuit structure of the over voltage protection reference signal output circuit, denoted as 11c. The over voltage protection reference signal output circuit 11c is similar to the over voltage protection reference signal output circuit 11a. Specifically, an inverter Inv coupled to the output terminal of the first comparator CMP1 is introduced to the over voltage protection reference signal output circuit 11c. The inverter Inv can generate a reverse signal of the first comparison signal S1 according to the first comparison signal S1. Here, in the over voltage protection reference signal output circuit 11c, a second switch SW2 can be replaced with a reversed-logic switch. For example, in the over voltage protection reference signal output circuits 11a and 11b, the second switch SW2 can be an N-type Metal-Oxide-Semiconductor. In the over voltage protection reference signal output circuit 11c, the second switch SW2 can be a P-type Metal-Oxide-Semiconductor. Thus, in the over voltage protection reference signal output circuit 11c, the following operation is still similar. When the voltage feedback signal FB is greater than the reference voltage FB_Ref, the second switch SW2 is operated under an open state. When the voltage feedback signal FB is smaller than the reference voltage FB_Ref, the second switch SW2 is operated under a short state. Similarly, in the over voltage protection reference signal output circuit 11c, the sampled voltage VS_DET is firstly amplified by using the amplifier AMP and then sampled/hold by using the second switch SW2 and the second capacitor C2. An operation of the over voltage protection reference signal output circuit 11c is similar to the operation of the over voltage protection reference signal output circuit 11a. Thus, the illustration is omitted here.

As aforementioned illustration, the over voltage protection reference signal OVP_Ref generated by amplifying the sampled voltage VS_DET and then processing the sample-and-hold mechanism is equivalent to the over voltage protection reference signal OVP_Ref generated by processing the sample-and-hold mechanism and then amplifying the sampled voltage VS_DET. Thus, in the over voltage protection reference signal output circuit 11c, connection sequence of the amplifier AMP, the second switch SW2, and the second capacitor C2 can be modified. FIG. 6 is a fourth circuit structure of the over voltage protection reference signal output circuit of the system, denoted as 11d. The over voltage protection reference signal output circuit 11d is similar to the over voltage protection reference signal output circuit 11c. Specifically, a connection sequence of the amplifier AMP, the second switch SW2, and the second capacitor C2 in the over voltage protection reference signal output circuit 11d is different from the over voltage protection reference signal output circuit 11c. Actually, the connection sequence of the amplifier AMP, the second switch SW2, and the second capacitor C2 in the over voltage protection reference signal output circuit 11d is identical to the over voltage protection reference signal output circuit 11b. Therefore, in the over voltage protection reference signal output circuit 11d, the sampled voltage VS_DET is firstly sampled/held by using the second switch SW2 and the second capacitor C2 and then amplified by using the amplifier AMP. An operation of the over voltage protection reference signal output circuit 11d is similar to the operation of the over voltage protection reference signal output circuit 11b. Thus, the illustration is omitted here.

Figure 7:
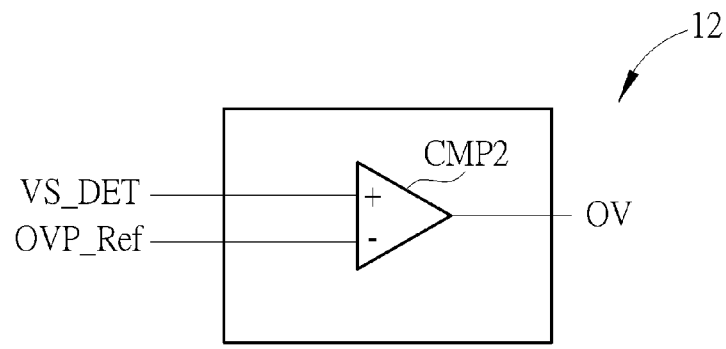
FIG. 7 is a circuit structure of an over voltage control signal output circuit of the system in FIG. 1.

FIG. 7 is a circuit structure of an over voltage control signal output circuit 12. The over voltage control signal output circuit 12 includes a second comparator CMP2. The second comparator CMP2 includes a first input terminal, a second input terminal, and an output terminal. The first input terminal is coupled to the voltage detection circuit 10 for receiving the sampled voltage VS_DET. The second input terminal is coupled to the over voltage protection reference signal output circuit 11 for receiving the over voltage protection reference signal OVP_Ref. The output terminal is used for outputting the over voltage control signal OV. In the over voltage control signal output circuit 12, when the sampled voltage VS_DET is greater than the over voltage protection reference signal OVP_Ref, the over voltage control signal OV outputting from the second comparator CMP2 is at a third voltage level. When the sampled voltage VS_DET is smaller than the over voltage protection reference signal OVP_Ref, the over voltage control signal OV outputting from the second comparator CMP2 is at a fourth voltage level. In other words, the over voltage control signal OV outputting from the second comparator CMP2 may have dual voltage levels. For example, when the fourth voltage level is a zero voltage level and the third voltage level is a high voltage level, the over voltage control signal OV can be regarded as a unipolar signal. Particularly, a rising edge of the over voltage control signal OV can trigger the over voltage protection circuit (OVP circuit) to enable circuit protection, as described below.

Figure 8:
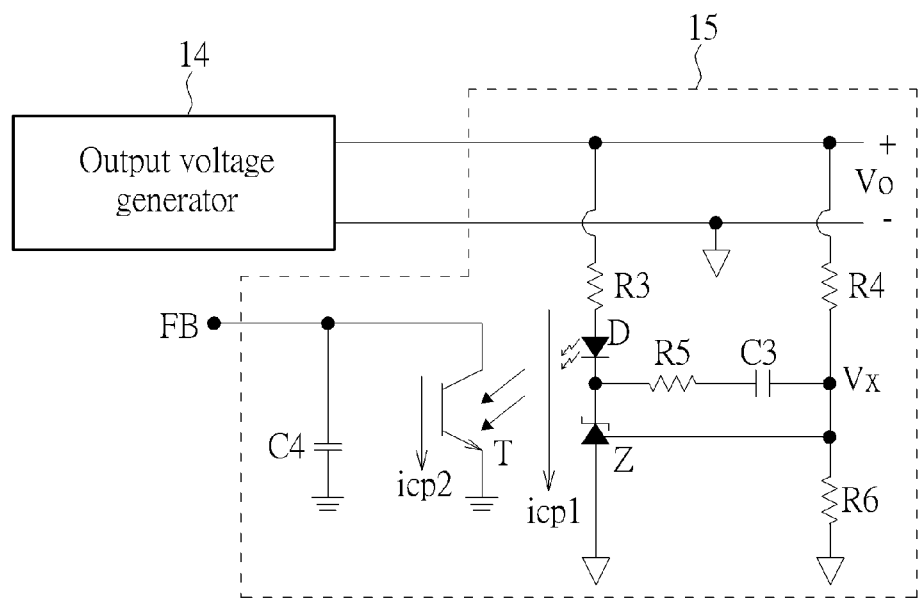
FIG. 8 is a circuit structure of a voltage feedback signal generation circuit for generating a voltage feedback signal to the system in FIG. 1.

As aforementioned illustration, the over voltage protection reference signal output circuit 11 is coupled to the voltage detection circuit 10 for outputting the over voltage protection reference signal OVP_Ref according to the sampled voltage VS_DET and the voltage feedback signal FB. For presentation completeness, a generation method and a characteristic of the voltage feedback signal FB are described below. FIG. 8 is a circuit structure of a voltage feedback signal generation circuit 15 for generating the voltage feedback signal FB. Here, the system 100 can further include the voltage feedback signal generation circuit 15. The voltage feedback signal generation circuit 15 can be coupled to an output of a voltage generator 14. Particularly, the output voltage generator 14 can be any physical type transformer, such as a coil winding-based transformer. The output voltage generator 14 is used for outputting an output voltage Vo. As shown in FIG. 8, the voltage feedback signal generation circuit 15 includes a plurality of resistors R3 to R6, capacitors C3 and C4, a light emitting diode D, a regulating diode Z, and a phototransistor T. The light emitting diode D can generate light signal according to a current pass through the light emitting diode D. The phototransistor T can generate a light current by using an optical coupling process. In the voltage feedback signal generation circuit 15, a feedback voltage Vx can be regarded as a divided voltage of the output voltage Vo. Thus, the feedback voltage Vx and the output voltage Vo are proportional.

When the feedback voltage Vx is smaller than a reference voltage of the regulating diode Z, the regulating diode Z is operated under an open state. A current icp1 passing through the light emitting diode D is quite small. A current icp2 passing through the phototransistor T is also quite small. Thus, the voltage feedback signal FB is at a high voltage, which controls the output voltage generator 14 to provide high power for boosting the output voltage Vo. When the feedback voltage Vx is greater than the reference voltage of the regulating diode Z, the regulating diode Z is operated under a short state. A current icp1 passing through the light emitting diode D becomes large, leading to increase an intensity of the light signal emitted from the light emitting diode D. Then, a current icp2 passing through the phototransistor T becomes large since the optical coupling process is triggered. In the meanwhile, if the output voltage Vo is abnormally increased, the current icp2 becomes small for stabilizing the output voltage Vo. In a normal condition, the voltage feedback signal FB is relevant to the output voltage Vo for stabilizing the output voltage Vo. In an abnormal condition, when the voltage feedback signal FB is abnormally boosted by some uncertain factors, the output voltage Vo may be boosted abnormally. Therefore, a conventional voltage converter or a loading device coupled to the conventional voltage converter may be damaged or burned out by the extremely high output voltage Vo since the conventional voltage converter lacks the system 100 for automatically enabling the OVP circuit at an appropriate moment.

In the following, all signal waveforms of the system 100 are illustrated in conjunction with a method for generating the over voltage control signal OV. Further, the aforementioned "amplifier AMP" of the embodiments can be any amplifier type, such as a power amplifier or an operational amplifier. The present invention is not limited to a specific amplifier or a specific circuit.

Figure 9:
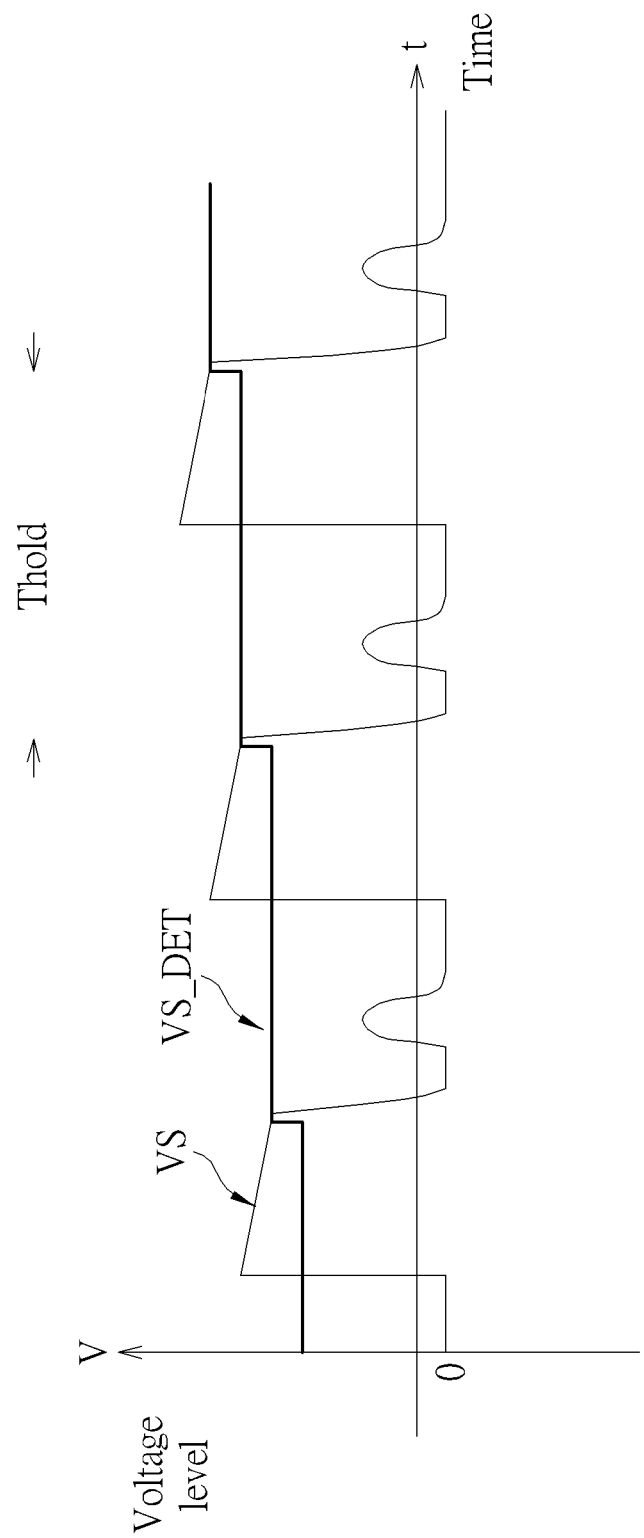
FIG. 9 is an illustration of a voltage received by the system in FIG. 1 and a sampled voltage.

FIG. 9 is an illustration of a voltage VS received by the system 100 and a sampled voltage VS_DET. Here, the voltage VS is received by the voltage detection circuit 10 (i.e., shown in FIG. 2A and FIG. 2B). The sampled voltage VS_DET is outputted from the voltage detection circuit 10. As aforementioned illustration, the voltage VS can be sampled and held by using the first switch SW1 and the first capacitor C1. Thus, the sampled voltage VS_DET outputted from the voltage detection circuit 10 can be regarded as a sample-and-hold result of the voltage VS. As shown in FIG. 9, an X-axis is denoted as a timeline. A Y-axis is denoted as a voltage level scale. The voltage VS can be a fluctuated voltage signal. Since the sampled voltage VS_DET can be regarded as the sample-and-hold result of the voltage VS, a waveform of the sampled voltage VS_DET is a stepped waveform. Specifically, a holding period Thold is equal to a period of the first switch SW1 operated under an open state. As a result, after the voltage VS is processed by using the sample-and-hold mechanism, the voltage detection circuit 10 outputs the sampled voltage VS_DET with stepped waveform.

Figure 10:
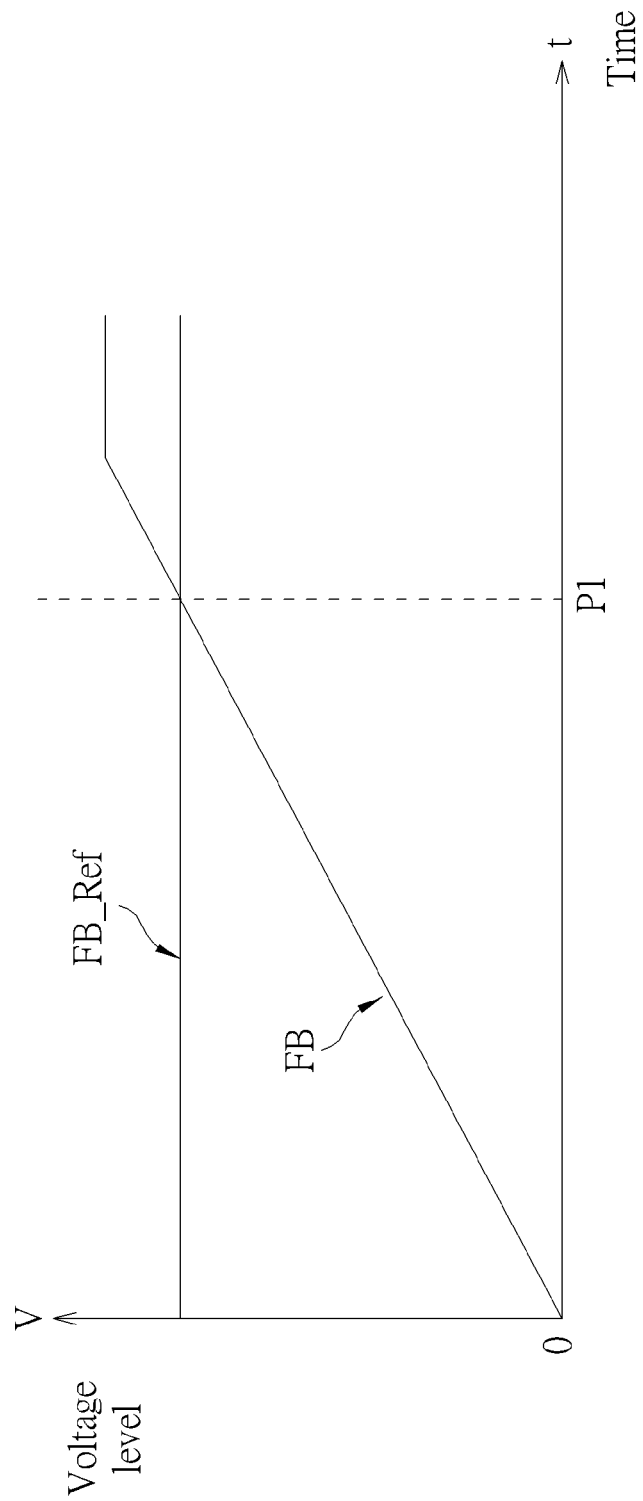
FIG. 10 is an illustration of a comparison of the voltage feedback signal with a reference voltage of the system in FIG. 1.

FIG. 10 is an illustration of a comparison of the voltage feedback signal FB with a reference voltage FB_Ref. In the over voltage protection reference signal output circuit 11 (i.e., shown in FIG. 3 to FIG. 6), when the voltage feedback signal FB is smaller than the reference voltage FB_Ref, the second switch SW2 is operated under a short state. Then, the sampled voltage VS_DET is sampled. An over voltage protection reference signal OVP_Ref is proportional to the sampled voltage VS_DET (i.e., a gain factor α is introduced since the amplifier AMP is used for amplifying the sampled voltage VS_DET). In other words, the over voltage protection reference signal OVP_Ref can be regarded as a sampling result of an amplified sampled voltage (i.e., α×VS_DET). When the voltage feedback signal FB is greater than the reference voltage FB_Ref, the second switch SW2 is operated under an open state. Then, the second capacitor C2 releases energy previously charged to keep the over voltage protection reference signal OVP_Ref at a voltage level previously sampled. Therefore, as shown in FIG. 9 and FIG. 10, the sampled voltage VS_DET is gradually increased. When the voltage feedback signal FB is smaller than the reference voltage FB_Ref during an original time point 0 to a time point P1, the over voltage protection reference signal OVP_Ref can be regarded as the sampling result of the amplified sampled voltage (i.e., α×VS_DET). It is expected that the over voltage protection reference signal OVP_Ref is also increased during the original time point 0 to the time point P1 (i.e., shown in FIG. 11A). After the time point P1, the voltage feedback signal FB is greater than the reference voltage FB_Ref. Then, the over voltage protection reference signal OVP_Ref is held at the voltage level previously sampled. It is expected that the over voltage protection reference signal OVP_Ref is fixed at a steady voltage after the time point P1 (i.e., shown in FIG. 11A).

Figures 11A, 11B, 11C:
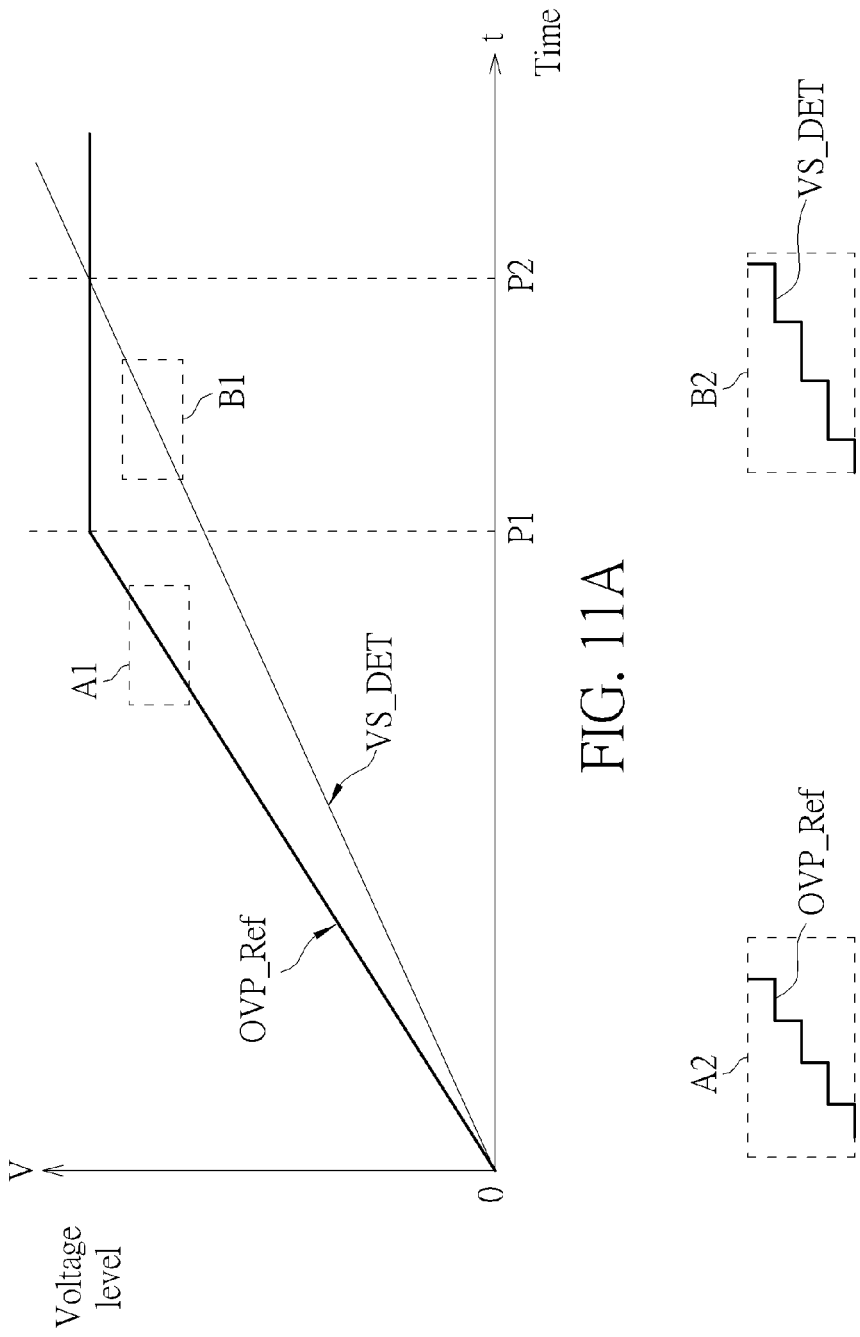
FIG. 11A is and illustration of a comparison of the sampled voltage with an over voltage protection reference signal of the system in FIG. 1.
FIG. 11B is an enlarged drawing of a region of the over voltage protection reference signal in FIG. 11A.
FIG. 11C is an enlarged drawing of a region of the sampled voltage in FIG. 11A.

FIG. 11A is an illustration of a comparison of the sampled voltage VS_DET with an over voltage protection reference signal OVP_Ref in the system 100. Here, signal waveforms shown in FIG. 11A corresponds to the over voltage control signal output circuit 12 in the system 100 (i.e., shown in FIG. 7). In the FIG. 11A, the over voltage protection reference signal OVP_Ref is increased during the original time point 0 to the time point P1, and then fixed at a steady voltage previously sampled after the time point P1. Further, in the over voltage control signal output circuit 12, when the sampled voltage VS_DET is smaller than the over voltage protection reference signal OVP_Ref, the over voltage control signal OV outputting from the second comparator CMP2 is at a fourth voltage level (i.e., a zero voltage level or a low voltage level). When the sampled voltage VS_DET is greater than the over voltage protection reference signal OVP_Ref, the over voltage control signal OV outputting from the second comparator CMP2 is at a third voltage level (i.e., a high voltage level). In FIG. 11A, the sampled voltage VS_DET is smaller than the over voltage protection reference signal OVP_Ref during the original time point 0 to a time point P2. It is expected that the over voltage control signal OV is at the low voltage level during the original time point 0 to a time point P2 (i.e., shown in FIG. 12). The sampled voltage VS_DET is greater than the over voltage protection reference signal OVP_Ref after the time point P2. It is expected that the over voltage control signal OV is at the high voltage after the time point P2 (i.e., shown in FIG. 12). Particularly, the sampled voltage VS_DET and the over voltage protection reference signal OVP_Ref are two signals processed by using sample-and-hold mechanism. Thus, the sampled voltage VS_DET should be varied to a stepped waveform. The over voltage protection reference signal OVP_Ref should also be a stepped waveform-based signal. The sampled voltage VS_DET and the over voltage protection reference signal OVP_Ref shown in FIG. 11A are approached to linear waveforms since a timeline scale (X-axis) can be enlarged for presentation simplicity. To avoid ambiguity, an enlarged drawing of a region of the over voltage protection reference signal OVP_Ref is illustrated. FIG. 11B is an enlarged drawing of a region A1 of the over voltage protection reference signal OVP_Ref in FIG. 11A. In other words, a region A2 in FIG. 11B is an enlarged version of the over voltage protection reference signal OVP_Ref in the region A1. Particularly, it can be observed that the over voltage protection reference signal OVP_Ref is a stepped waveform-based signal. Similarly, an enlarged drawing of a region of the sampled voltage VS_DET is illustrated. FIG. 11C is an enlarged drawing of a region B1 of the sampled voltage VS_DET in FIG. 11A. In other words, a region B2 in FIG. 11C is an enlarged version of the sampled voltage VS_DET in the region B1. Particularly, it can be observed that the sampled voltage VS_DET is varied to the stepped waveform.

Figure 12:
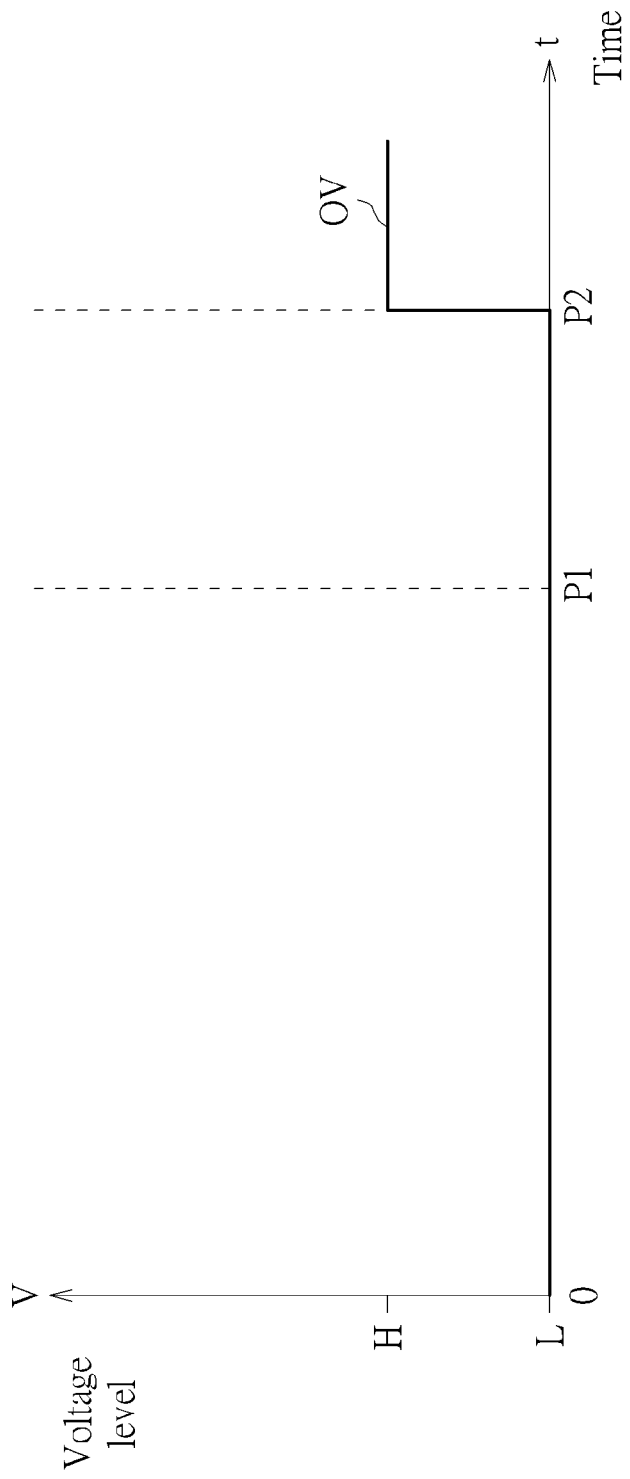
FIG. 12 is a waveform of an over voltage control signal generated by the system in FIG. 1.

FIG. 12 is a waveform of an over voltage control signal OV generated by the system 100. As aforementioned illustration, the over voltage control signal OV is at the low voltage level L during the original time point 0 to the time point P2. The over voltage control signal OV is at the high voltage H after the time point P2. Since the over voltage control signal OV has dual voltage levels, an over voltage protection circuit (OVP circuit) can be operated accordingly. For example, when the OVP circuit receives the over voltage control signal OV with the low voltage level L, the OVP circuit is not triggered to perform a circuit protection function, denoted as a normal mode. When the OVP circuit receives the over voltage control signal OV with the high voltage level H, the OVP circuit is triggered to perform the circuit protection function, denoted as a protection mode. In other words, according to the over voltage control signal OV, an operational state of the OVP circuit can be determined. In the embodiment, the OVP circuit can be triggered to perform the circuit protection function after the time point P2.

Figure 13:
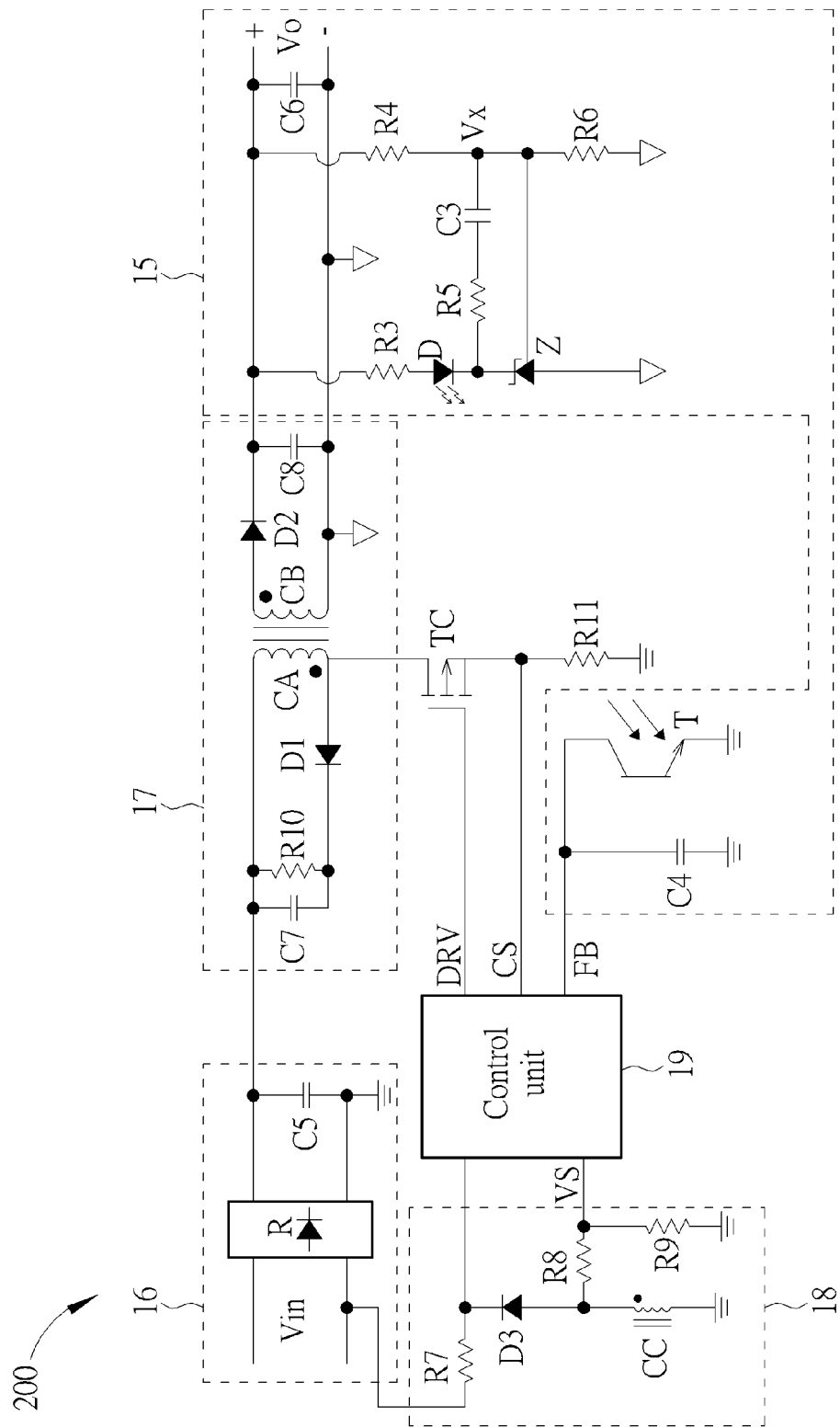
FIG. 13 is a circuit structure of a voltage converter capable of performing an operation of over voltage protection dynamically according to an embodiment of the present invention.

FIG. 13 is a circuit structure of a voltage converter 200 capable of performing an operation of over voltage protection dynamically. Here, the system 100 previously illustrated can be applied to a Fly-back based voltage converter 200. However, applications of the system 100 in the present invention are not limited to be applied to the Fly-back based voltage converter 200 (hereafter, say "the voltage converter 200"). Any reasonable hardware modification falls into the scope of the present invention. In FIG. 13, the voltage converter 200 includes a voltage input circuit 16, a transformer module 17, a voltage feedback signal generation circuit 15, a voltage induction module 18, and a control unit 19. The voltage input circuit 16 is used for receiving an input voltage Vin. The voltage input circuit 16 can include a rectifier R and a capacitor C5. The rectifier R is coupled to the capacitor C in parallel. The transformer module 17 is coupled to the voltage input circuit 16 for converting the input voltage Vin to an output voltage Vo. The transformer module 17 includes a first coil winding CA and a second coil winding CB. The transformer module 17 can optionally include a buffer circuit including a diode D1, a resistor R10, and a capacitor C7. A first terminal and a second terminal of the first coil winding CA are coupled to the buffer circuit. The first terminal of the first coil winding CA is also coupled to the rectifier R. The second terminal of the first coil winding CA is also coupled to a transistor TC. A first terminal of the second coil winding CB can generate the output voltage Vo through a diode D2. However, the resistor R10, the capacitor C7, and the diode D1 can be omitted in other embodiments. The transformer module 17 can optionally include a capacitor C8. The voltage feedback signal generation circuit 15 is identical to the circuit structure previously shown in FIG. 8. Thus, denotations of circuit components in the voltage feedback signal generation circuit 15 follows the denotations in FIG. 8. Operations of the voltage feedback signal generation circuit 15 are illustrated here. The voltage feedback signal generation circuit 15 includes a light emitting diode D, a regulating diode Z, a phototransistor T, and a plurality of resistors R3 to R6. The light emitting diode D is coupled to the regulating diode Z and the transformer module 17 through the resistor R3. The phototransistor T is coupled to the control unit 19 for to generating a light current according to an operational state of the light emitting diode D. As aforementioned, in the voltage feedback signal generation circuit 15, at least two resistors (i.e., resistors R4 and R6) are used for dividing the output voltage Vo and generating a feedback voltage Vx. When the feedback voltage Vx is smaller than a reference voltage of the regulating diode Z, the regulating diode Z is operated under an open state. When the feedback voltage Vx is greater than the reference voltage of the regulating diode Z, the regulating diode Z is operated under a short state. The voltage feedback signal generation circuit 15 can optionally include a capacitor C6. The voltage induction module 18 is coupled to the voltage input circuit 16. The voltage induction module 18 includes a third coil winding CC and a voltage divider formed by a resistor R8 and a resistor R9. The third coil winding CC is used for inducing the output voltage Vo. The voltage divider formed by the resistor R8 and the resistor R9 is coupled to the third coil winding CC and the control unit 19 for dividing the output voltage Vo and generating the voltage VS received by the control unit 19. Further, the voltage induction module 18 can be coupled to the voltage input circuit 16 through a resistor R7 and a diode D3 coupled to the third coil winding CC. The control unit 19 can be a control chip, a control circuit, or a processor. The control unit 19 is coupled to the transformer module 17, the voltage feedback signal generation circuit 15, and the voltage induction module 18 for controlling the transformer module 17. For example, the control unit 19 can generate a driving control signal DRV and a control signal CS for switching the transistor TC through a resistor R11. By doing so, the control unit 19 can adjust a current status and a voltage status of the transformer module 17. Specifically, the control unit 19 includes the system 100 capable of dynamically controlling an operation of over voltage protection. In other words, the control unit 19 includes a voltage detection circuit 10, an over voltage protection reference signal output circuit 11, and an over voltage control signal output circuit 12, as shown previously. Similarly, the voltage detection circuit 10 is used for detecting the voltage VS and outputting a sampled voltage VS_DET according to the voltage VS. The over voltage protection reference signal output circuit 11 is coupled to the voltage detection circuit 10 for generating an over voltage protection reference signal OVP_Ref according to the sampled voltage VS_DET and the voltage feedback signal FB. The over voltage control signal output circuit 12 is coupled to the voltage detection circuit 10 and the over voltage protection reference signal output circuit 11 for generating an over voltage control signal OV according to the sampled voltage VS_DET and the over voltage protection reference signal OVP_Ref. Further, the control unit 19 can further include an over voltage protection circuit (OVP circuit) for dynamically performing a circuit protection function according to the over voltage control signal OV.

To sum up, the present invention discloses a system for dynamically controlling an operation of over voltage protection. The system can be applied to a voltage converter. The system has a capability of continuously detecting an output voltage and providing a dynamic voltage protection threshold of the voltage converter. Instead using a fixed voltage protection threshold for triggering the over voltage protection, the system of the present invention can continuously detect the output voltage and a corresponding voltage feedback signal for automatically generating a dynamic voltage protection threshold. Further, the voltage protection threshold generated by the system is varied based on variations of the output voltage and the corresponding voltage feedback signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converter capable of performing an operation of over voltage protection dynamically, comprising:
   a voltage input circuit configured to receive an input voltage;
   a transformer module coupled to the voltage input circuit and configured to convert the input voltage to an output voltage;
   a voltage feedback signal generation circuit coupled to the transformer module and configured to generate a voltage feedback signal;
   a voltage induction module coupled to the voltage input circuit and configured to generate a voltage; and
   a control unit coupled to the transformer module, the voltage feedback signal generation circuit and the voltage induction module and configured to control the transformer module, the control unit comprising:
      a voltage detection circuit configured to detect the voltage and output a sampled voltage according to the voltage;
      an over voltage protection reference signal output circuit coupled to the voltage detection circuit and configured to generate an over voltage protection reference signal according to the sampled voltage and the voltage feedback signal, the over voltage protection reference signal output circuit comprising:
         an amplification storage circuit configured to output the over voltage protection reference signal according to the sampled voltage and a first comparison signal; and
         a first comparator comprising:
            a first input terminal configured to receive the voltage feedback signal;
            a second input terminal configured to receive a reference voltage; and
            an output terminal coupled to the amplification storage circuit and configured to output the first comparison signal to the amplification storage circuit; and
      an over voltage control signal output circuit coupled to the voltage detection circuit and the over voltage protection reference signal output circuit and configured to generate an over voltage control signal according to the sampled voltage and the over voltage protection reference signal.

2. The voltage converter of claim 1, wherein the amplification storage circuit comprises:
   an amplifier comprising:
      a first input terminal coupled to the voltage detection circuit and configured to receive the sampled voltage;
      a second input terminal; and
      an output terminal configured to output an amplified voltage;
   a first resistor comprising:
      a first terminal coupled to a ground terminal; and
      a second terminal coupled to the second input terminal of the amplifier;
   a second resistor comprising:
      a first terminal coupled to the second terminal of the first resistor; and
      a second terminal coupled to the output terminal of the amplifier;
   a second switch comprising:
      a first terminal coupled to the second terminal of the second resistor and configured to receive the amplified voltage;
      a second terminal configured to output the amplified voltage when the second switch is operated under a short state; and
      a control terminal coupled to the output terminal of the first comparator and configured to receive the first comparison signal; and
   a second capacitor comprising:
      a first terminal coupled to the second terminal of the second switch and configured to output the over voltage protection reference signal; and
      a second terminal coupled to the ground terminal;
   wherein when the voltage feedback signal is greater than the reference voltage, the first comparison signal outputted from the first comparator is at a first voltage level so as to operate the second switch under an open state, and when the voltage feedback signal is smaller than the reference voltage, the first comparison signal outputted from the first comparator is at a second voltage level so as to operate the second switch under the short state.

3. The voltage converter of claim 1, wherein the amplification storage circuit comprises:
   a second switch comprising:
      a first terminal coupled to the voltage detection circuit and configured to receive the sampled voltage;

a second terminal configured to output the sampled voltage when the second switch is operated under a short state; and
a control terminal coupled to the output terminal of the first comparator and configured to receive the first comparison signal;

a second capacitor comprising:
a first terminal coupled to the second terminal of the second switch; and
a second terminal coupled to a ground terminal;

an amplifier comprising:
a first input terminal coupled to the first terminal of the second capacitor;
a second input terminal; and
an output terminal configured to output the over voltage protection reference signal;

a first resistor comprising:
a first terminal coupled to the ground terminal; and
a second terminal coupled to the second input terminal of the amplifier; and a second resistor comprising:
a first terminal coupled to the second terminal of the first resistor; and
a second terminal coupled to the output terminal of the amplifier;

wherein when the voltage feedback signal is greater than the reference voltage, the first comparison signal outputted from the first comparator is at a first voltage level so as to operate the second switch under an open state, and when the voltage feedback signal is smaller than the reference voltage, the first comparison signal outputted from the first comparator is at a second voltage level so as to operate the second switch under the short state.

4. A voltage converter capable of performing an operation of over voltage protection dynamically, comprising:
a voltage input circuit configured to receive an input voltage;
a transformer module coupled to the voltage input circuit and configured to convert the input voltage to an output voltage;
a voltage feedback signal generation circuit coupled to the transformer module and configured to generate a voltage feedback signal;
a voltage induction module coupled to the voltage input circuit and configured to generate a voltage; and
a control unit coupled to the transformer module, the voltage feedback signal generation circuit and the voltage induction module and configured to control the transformer module, the control unit comprising:
a voltage detection circuit configured to detect the voltage and output a sampled voltage according to the voltage;
an over voltage protection reference signal output circuit coupled to the voltage detection circuit and configured to generate an over voltage protection reference signal according to the sampled voltage and the voltage feedback signal; and
an over voltage control signal output circuit coupled to the voltage detection circuit and the over voltage protection reference signal output circuit and configured to generate an over voltage control signal according to the sampled voltage and the over voltage protection reference signal, the over voltage control signal output circuit comprises a second comparator, and the second comparator comprising:

a first input terminal coupled to the voltage detection circuit and configured to receive the sampled voltage;
a second input terminal coupled to the over voltage protection reference signal output circuit and configured to receive the over voltage protection reference signal; and
an output terminal configured to output the over voltage control signal;
wherein when the sampled voltage is greater than the over voltage protection reference signal, the over voltage control signal is at a third voltage level, and when the sampled voltage is smaller than the over voltage protection reference signal, the over voltage control signal is at a fourth voltage level.

5. The voltage converter of claim 4, wherein when the over voltage control signal is at the third voltage level, an over voltage protection circuit is enabled, and when the over voltage control signal is at the fourth voltage level, the over voltage protection circuit is disabled.

6. A voltage converter capable of performing an operation of over voltage protection dynamically, comprising:
a voltage input circuit configured to receive an input voltage;
a transformer module coupled to the voltage input circuit and configured to convert the input voltage to an output voltage;
a voltage feedback signal generation circuit coupled to the transformer module and configured to generate a voltage feedback signal;
a voltage induction module coupled to the voltage input circuit and configured to generate a voltage; and
a control unit coupled to the transformer module, the voltage feedback signal generation circuit and the voltage induction module and configured to control the transformer module, the control unit comprising:
a voltage detection circuit configured to detect the voltage and output a sampled voltage according to the voltage;
an over voltage protection reference signal output circuit coupled to the voltage detection circuit and configured to generate an over voltage protection reference signal according to the sampled voltage and the voltage feedback signal; and
an over voltage control signal output circuit coupled to the voltage detection circuit and the over voltage protection reference signal output circuit and configured to generate an over voltage control signal according to the sampled voltage and the over voltage protection reference signal.

7. The voltage converter of claim 6, wherein the voltage input circuit comprises a rectifier and a capacitor, and the rectifier is coupled to the capacitor in parallel.

8. The voltage converter of claim 6, wherein the transformer module comprises a first coil winding and a second coil winding, a first terminal and a second terminal of the first coil winding are coupled to a buffer circuit, a first terminal of the second coil winding outputs the output voltage through a diode, and the buffer circuit comprises at least one capacitor, at least one resistor, and at least one diode.

9. The voltage converter of claim 6, wherein the voltage feedback signal generation circuit comprises a light emitting diode, a regulating diode, a phototransistor, and a plurality of resistors, the light emitting diode is coupled to the regulating diode and the transformer module through a resistor, and the phototransistor is coupled to the control unit and configured to generate a light current according to an operational state of the light emitting diode.

10. The voltage converter of claim 9, wherein at least two resistors of the plurality of resistors are configured to divide the output voltage for generating a feedback voltage, when the feedback voltage is smaller than a reference voltage of the regulating diode, the regulating diode is operated under an open state gradually, and when the feedback voltage is greater than the reference voltage of the regulating diode, the regulating diode is operated under a short state gradually.

11. The voltage converter of claim 6, wherein the voltage induction module comprises a third coil winding and a voltage divider, the third coil winding is configured to induce the output voltage, the voltage divider is coupled to the third coil winding and the control unit and configured to divide the output voltage for generating the voltage received by the control unit.

* * * * *